United States Patent [19]

Lense

[11] 4,387,942
[45] Jun. 14, 1983

[54] DRAWER SLIDE ASSEMBLY

[75] Inventor: Robert F. Lense, Rockford, Ill.

[73] Assignee: Amerock Corporation, Rockford, Ill.

[21] Appl. No.: 211,089

[22] Filed: Nov. 28, 1980

[51] Int. Cl.³ .................... A47B 88/10; F16C 21/00
[52] U.S. Cl. ........................... 312/334; 312/341 R;
                                            312/349; 308/3.8
[58] Field of Search ........ 312/330 R, 341 R, 341 NR,
                                            312/334, 349; 308/3.8

[56]     References Cited
       U.S. PATENT DOCUMENTS

| | | | |
|---|---|---|---|
| 2,675,277 | 4/1954 | McClellan | 308/3.8 |
| 2,739,028 | 3/1956 | Siggia | 312/349 |
| 2,864,656 | 12/1958 | Yorinks | 308/3.8 |
| 3,094,363 | 6/1963 | Fremstad et al. | 308/3.8 |
| 3,482,888 | 12/1969 | Anderson | 308/3.8 |
| 3,697,140 | 10/1972 | Livingston | 308/3.8 |
| 3,716,279 | 2/1973 | Anderson et al. | 308/3.8 |
| 3,744,869 | 7/1973 | Anderson et al. | 312/330 |
| 3,944,302 | 3/1976 | Fourrey | 308/3.8 |
| 3,980,364 | 9/1976 | Entrikin et al. | 312/341 R |

FOREIGN PATENT DOCUMENTS 2518647 12/1976 Fed. Rep. of Germany ... 312/341 R

Primary Examiner—Victor N. Sakran
Attorney, Agent, or Firm—Leydig, Voit, Osann, Mayer & Holt, Ltd.

[57]     ABSTRACT

A drawer slide assembly for supporting a drawer to slide open and closed in an opening in a cabinet frame includes an elongated upper member extending longitudinally of the drawer and secured to the latter and a parallel lower member spaced below the upper member and secured to the frame. A pair of rollers are journaled side by side on the upper member near the rear thereof and engage track sections formed on the lower member. Similarly, a second pair of rollers are journaled on the lower member near the front thereof and engage track sections formed on the upper member. The rollers are given a short axial profile while having effective diameters greater than their actual diameters by forming the rollers with surfaces which are inclined at acute angles relative to the roller axes and the associated track sections are inclined at similar angles. Each of the second pair of rollers is journaled by a plurality of bearing balls which are arranged so that the line of force of the load of the drawer is offset from the centers of the balls in a direction to produce a force couple which results in all of the balls supporting a portion of the load.

9 Claims, 14 Drawing Figures

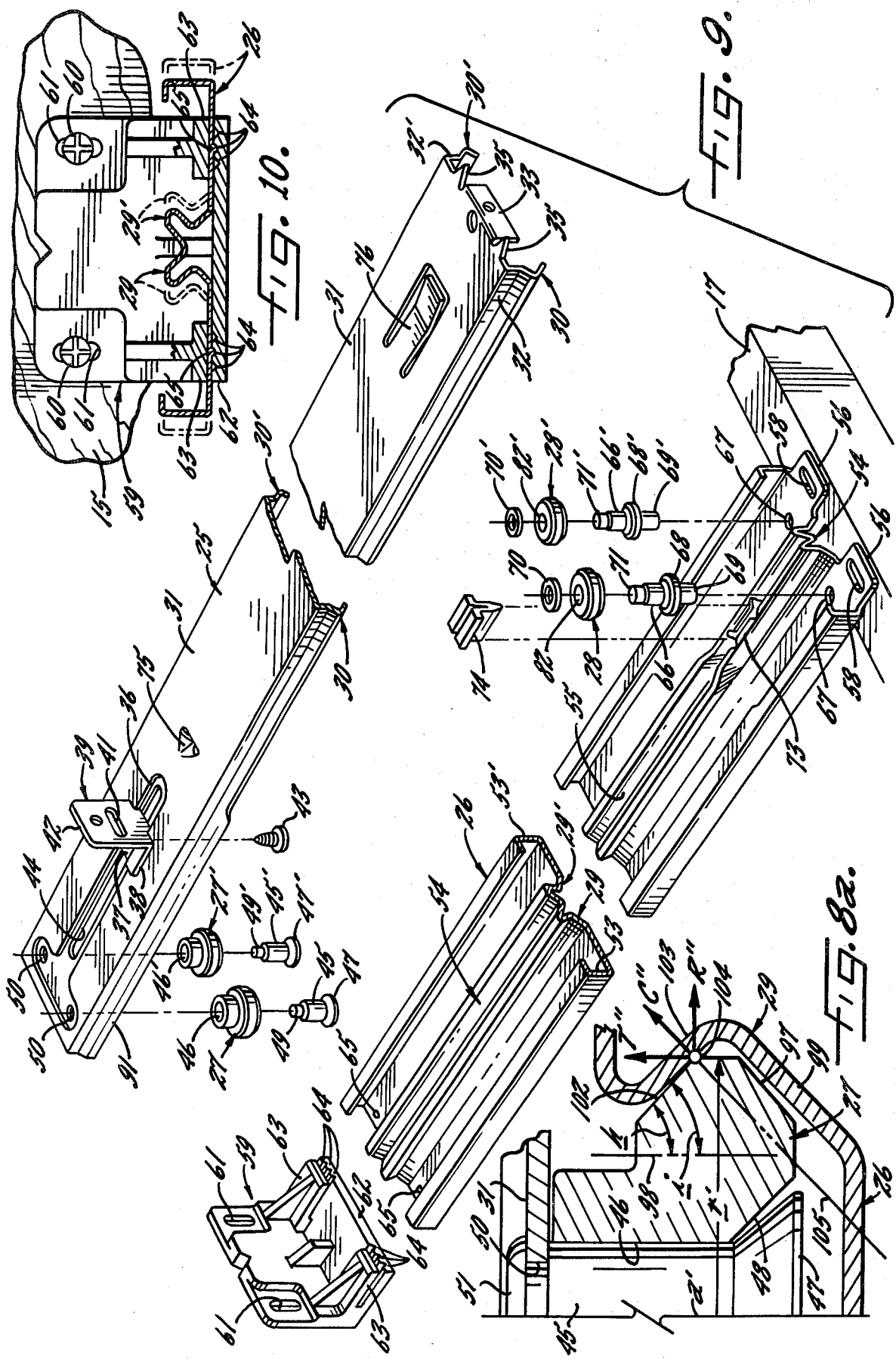

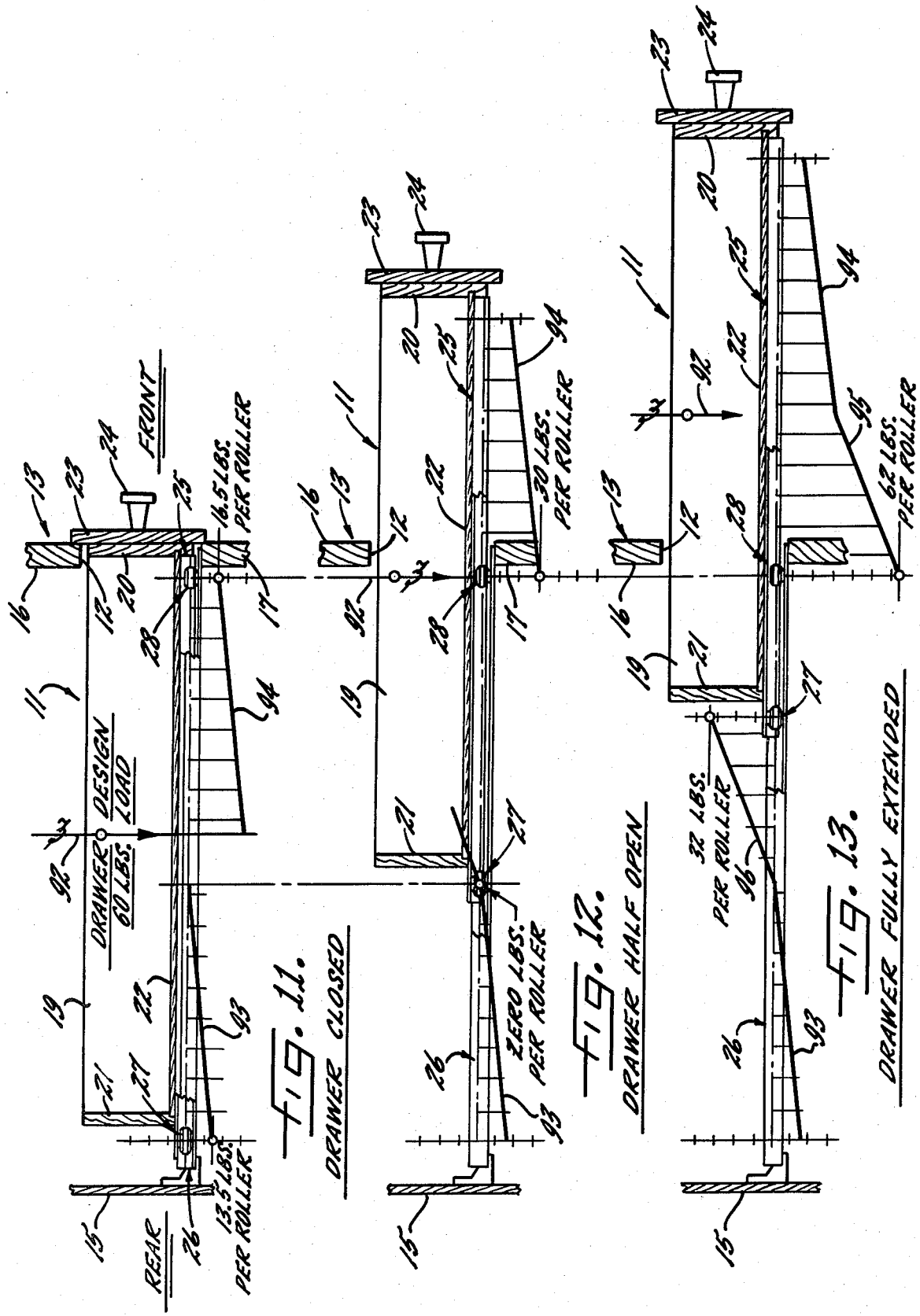

DRAWER SLIDE ASSEMBLY

BACKGROUND OF THE INVENTION

This invention relates to a drawer slide assembly for supporting a drawer to slide in an opening in the frame of a cabinet. Such assemblies include at least two elongated members opposing each other and extending longitudinally of the drawer with one member secured to the drawer and the other secured to the cabinet frame. At least one roller is journaled on one of the members and rolls on a track section formed on the other member as the drawer is opened and closed. In its more detailed aspects, the invention relates to an assembly in which at least one such roller is journaled on each member and rolls in a track section formed on the other member and, further, to an assembly which is adapted to be mounted on the underside of the drawer and extend along the longitudinal center of the latter.

SUMMARY OF THE INVENTION

The general object of the invention is to provide a novel construction and arrangement of the rollers and the associated track sections so that each roller has a relatively short axial profile but, at the same time, the roller has an effective diameter substantially greater than its actual diameter thereby increasing the load-bearing capacity of the roller.

A more detailed object is to achieve the foregoing by forming the surface of each roller as a frustum of a cone so that the surface is inclined at an acute angle relative to the axis of the roller and by inclining the associated track section at a similar angle whereby the force between the track and the roller resulting from the load of the drawer acts along a line generally perpendicular to the roller surface.

A further object is to make the angle of the roller slightly smaller than the angle of the associated track section so that the latter engages the roller surface at a succession of small areas or points forming a circle around the surface thereby to reduce the possibility of interference between the roller and the track section.

The invention also resides in the details of the rollers and of their mounting and in the particular formation of the track sections.

BRIEF DESCRIPTION OF THE DRAWINGS

FIG. 8a is a view similar to FIG. 8 but showing the parts in a moved position.

FIG. 9 is an exploded perspective view of the slide assembly.

FIG. 10 is an enlarged sectional view taken along the line 10—10 in FIG. 2.

FIG. 11 is a sectional view similar to FIG. 2 but on a reduced scale.

FIG. 12 is a view similar to FIG. 11 but with the drawer partially open.

FIG. 13 is a view similar to FIG. 11 but with the drawer fully open.

DETAILED DESCRIPTION OF THE PREFERRED EMBODIMENT

Figure 1:
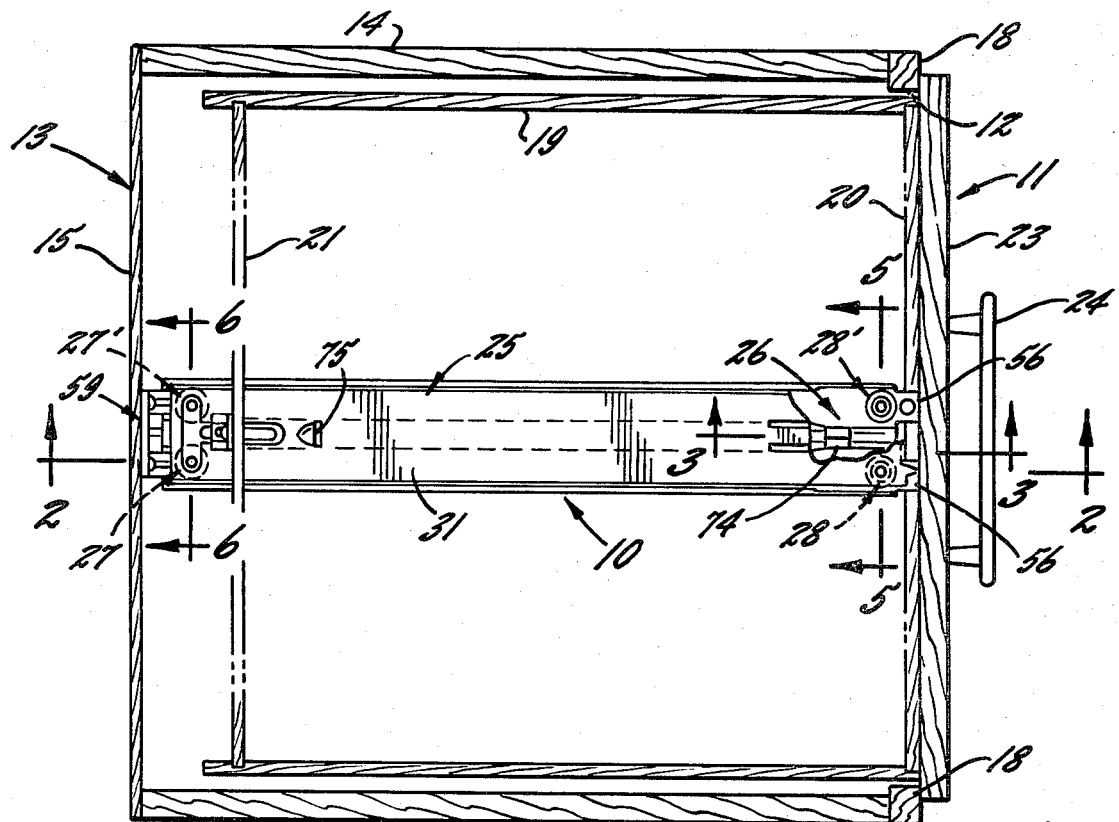
FIG. 1 is a horizontal sectional view showing a drawer mounted in a cabinet by means of a slide assembly embodying the present invention.
Figure 2:
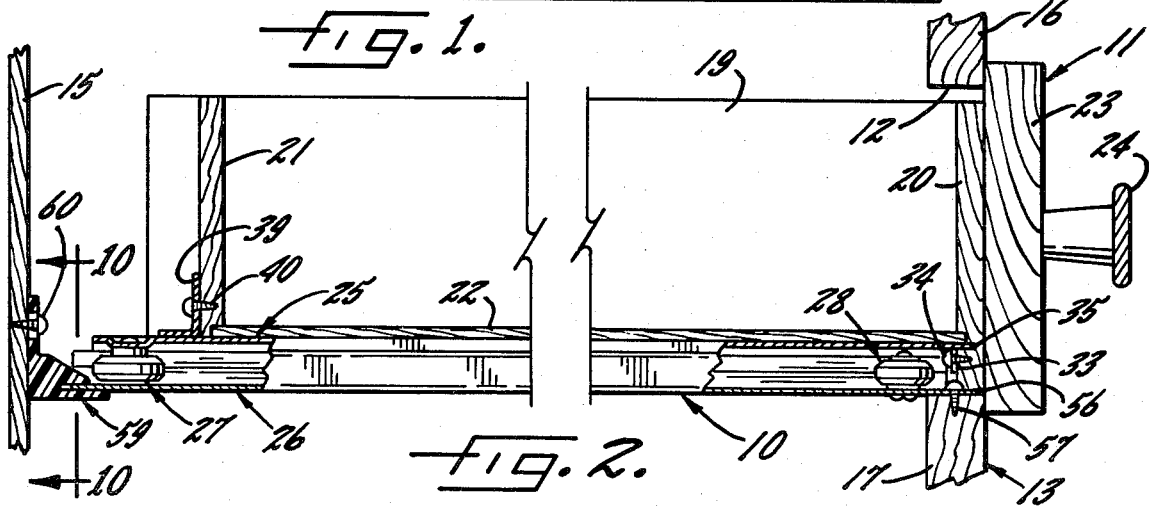
FIG. 2 is an enlarged fragmentary sectional view taken along the line 2—2 in FIG. 1.

As shown in the drawings for purposes of illustration, the invention is embodied in a slide assembly 10 for supporting a drawer 11 to slide in an opening 12 in a cabinet frame 13. Herein, the latter includes parallel vertical side walls 14 which are joined at their inner edges by a vertical back wall 15. The opening 12 is in the front of the cabinet frame and is defined by upper and lower horizontal rails 16 and 17 which span and are attached to the side walls 14 and by vertical stiles 18 on the front edges of the side walls. As is customary, the drawer 11 includes parallel vertical side panels 19 which are spaced inwardly a short distance from the side walls 14 (see FIG. 1) and are slightly shorter vertically than the opening 12 as shown in FIG. 2. The drawer also includes front and rear walls 20 and 21 and which are level at the top with the side panels and span the latter and which are fastened to the panels. A bottom panel 22 is fastened to the side panels and to the front and rear walls of the drawer and, as seen in FIG. 2, the front wall projects a short distance below the bottom panel. Flush against the outside of the front wall and fixed thereto is a rectangular facing member 23 which is larger than the front wall both horizontally and vertically so as to abut the frame 13 along all four sides of the opening 12 when the drawer is closed and a suitable handle 24 is secured to the facing member.

Figure 5:
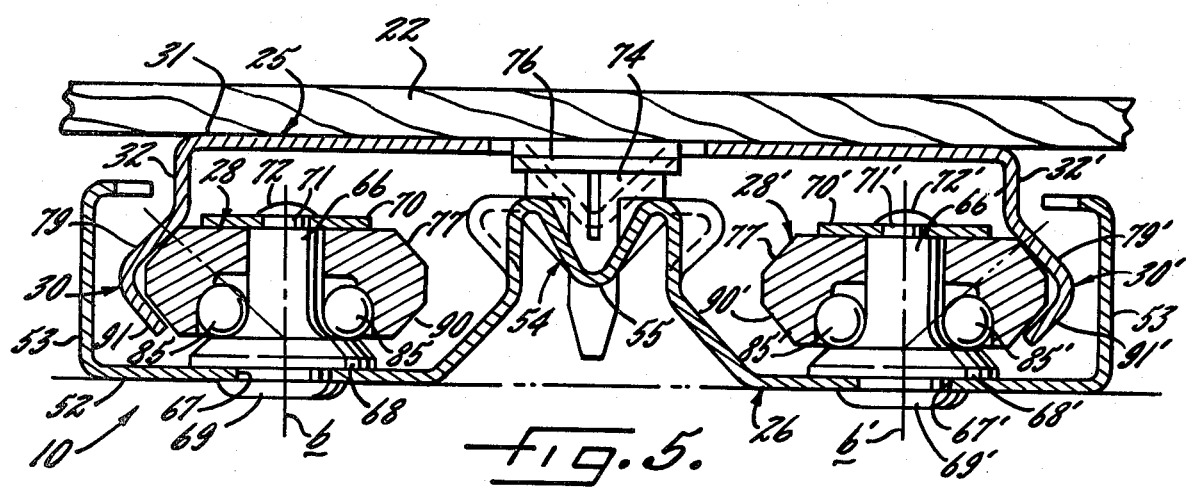
FIG. 5 is an enlarged fragmentary sectional view taken along the line 5—5 in FIG. 1.

Although the slide assembly 10 may be formed in two parts with one part disposed alongside each side panel 19, it is shown herein for purposes of illustration as a unitary assembly disposed beneath the bottom panel 22 at the center thereof. The slide assembly includes upper and lower elongated parallel members 25 and 26 which extend substantially from the lower rail 17 of the cabinet to the rear wall 15 and which form track portions and the assembly also includes one or more rollers rolling in the track portions as the drawer 11 is opened and closed. Herein, the upper member 25 is fastened to the underside of the bottom panel 22 to move bodily with the drawer and the lower member 26 is spaced below the upper member with the ends fastened respectively to the lower rail 17 and the back wall 15 of the cabinet. Also, in the preferred embodiment, four rollers are utilized, two rollers 27 and 27' being journaled side by side on the upper member 25 adjacent the inner or rear end thereof and two rollers 28 and 28' being journaled side by side on the lower member 26 near the front end of the latter. All four rollers are disposed between the members 25 and 26 with the rollers 27 and 27' rolling in track portions 29 and 29' (FIG. 6) formed on the lower member and the rollers 28 and 28' rolling in track portions 30 and 30' (FIG. 5) formed on the upper member.

In the present instance, the upper member 25 is stamped from sheet metal and is formed with a flat plate 31 which lies against the underside of the bottom panel 22 of the drawer 11 and with skirts 32 and 32' which depend from the edges of the plate, the track portions 30 and 30' being formed on the skirts 32 and 32' respectively. Depending from the front end of the plate 31 is a tab 33 (FIGS. 2 and 9) which butts against that portion of the front wall 20 of the drawer which is below the bottom panel 22 and the tab is secured to the front wall by a suitable fastener 34. Points 35 project forwardly from the plate and are driven into the front wall 20 to prevent the upper member 25 from turning. A longitudinally extending depression 36 is in the rear end portion of the plate 31 (see FIG. 9) and an indentation 37 formed in the horizontal leg 38 of an L-shaped clip 39 slides in the depression. A screw 40 (FIG. 2) projects through a horizontal slot 41 in the upright leg 42 of the clip and is threaded into the rear wall 21 of the drawer, the clip being slidable in the depression 36 to accommodate the particular depth of the drawer. The clip is held in place on the plate 31 by a screw 43 (FIG. 9) which projects up through a slot 44 in the center of the depression 36 and is threaded into the leg 38. Thus, the clip 39 and the tab 33 secure the upper member 25 to the bottom of the drawer.

Figure 6:
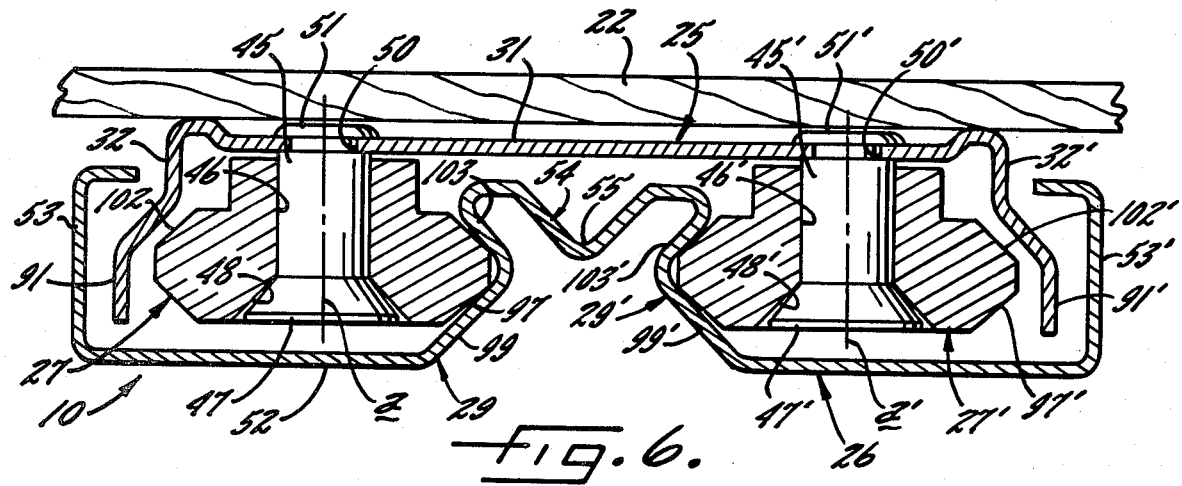
FIG. 6 is an enlarged fragmentary sectional view taken along the line 6—6 in FIG. 1.

The rollers 27 and 27' which are mounted on the upper member 25 may be made of any suitable material such as a nylon impregnated with a lubricating material and turn about vertical axes a and a' (FIG. 6). These rollers are disposed between the upper and lower members 25 and 26, that is, on the underside of the upper member, and turn about stationary vertical shafts or studs 45 and 45'. Thus, the stud 45 is received in a central bore 46 in the roller 27 and an enlarged conical head 47 on the lower end of the stud is received in a counterbore 48 of generally the same shape at the lower end of the bore. Initially, the upper end portion 49 of the stud is reduced in diameter as shown in FIG. 9 and this end portion is inserted through a hole 50 in the upper member 25 and is upset as indicated at 51 in FIG. 6. The stud 46' similarly mounts the roller 27' on the upper member, corresponding parts being indicated by the same but primed reference characters.

Herein, the lower member 26 is rolled from sheet metal and includes a plate 52 and flanges 53 (FIGS. 5, 6 and 9) projecting upwardly from the edges of the plate and inwardly over the skirts 30 and 30' on the upper member 25 to substantially enclose the space between the members where all four rollers are located. The longitudinal central portion 54 of the plate 52 is rolled upwardly to form the track portions 29 and 29' back to back which are spanned by a V-shaped web 55. Two tongues 56 (FIGS. 1, 2 and 9) project forwardly from the plate 52 on opposite sides of the center portion 54 to lie on the lower rail 17 of the cabinet and screws 57 project through transverse slots 58 in the tongues and are threaded into the lower rail to secure the lower member 26 to the cabinet frame, the slots permitting some transverse adjustment of the position of the slide assembly on the frame.

To support the rear of the slide assembly on the cabinet frame, a plastic bracket 59 (FIGS. 1, 2, 9 and 10) molded of any suitable material such as nylon is secured to the back wall 15 of the frame by screws 60 projecting through vertical slots 61 in the bracket and threaded into the wall. The plate 52 of the lower member 26 abuts the upper surface of a forwardly projecting flange 62 on the bracket. Spaced fingers 63 project forwardly from the rear of the bracket and into the spaces between the flanges 53 and the center portion 54 of the lower member and the fingers 63 are resilient to hold the plate 52 down against the bracket flange 62. A plurality of grooves 64, herein three, are formed in the flange 62 under each finger 63 and selectively receive dimples 65 struck down from the plate 52 to hold the lower member 26 and hence the slide assembly against lateral movement. Normally, the dimples are received in the center grooves as shown in FIG. 10 but, if this results in the drawer being slightly misaligned, the rear end of the lower member may be given a lateral blow in either direction and, because of the resiliency of the fingers 63, the dimples shift to an adjacent groove with a corresponding shift of the rear end of the lower member as indicated by the broken lines in FIG. 10.

The rollers 28 and 28', which are molded of a suitable plastic such as nylon, are mounted on the lower member 26 by means of stationary shafts or studs 66 and 66' (see FIGS. 5 and 9) with vertical axes b and b' and, for reasons set forth below, these rollers are somewhat smaller than the rollers 27 and 27'. Thus, the stud 66 projects through a hole 67 in the plate 52 and is formed with a flange 68 which abuts the upper side of the plate and is clamped against the latter by a head 69 on the lower end of the stud. The roller 28 is received on the main body of the stud and is held on the body by a washer 70 which encircles a reduced upper portion 71 on the stud, the upper end of the stud being upset to form a head 72 clamping the washer against the roller. As shown in FIG. 9, the stud, the roller, and the washer may be preassembled prior to the formation of the head 69 which is upset after the stud has been inserted through the hole 67 in the plate 52. The assembly for the roller 28' is the same as for the roller 28 with corresponding parts being indicated by the same but primed reference characters.

Figures 3, 4:
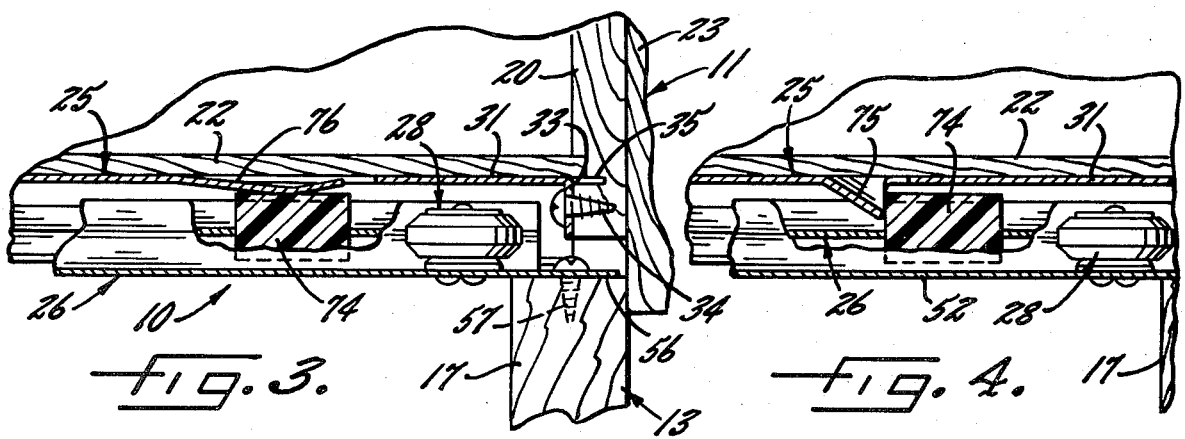
FIG. 3 is an enlarged fragmentary sectional view taken along the line 3—3 in FIG. 1.
FIG. 4 is a view similar to FIG. 3 but showing the parts in the moved position.

To limit the outward travel of the drawer 11, the central portion 54 of the lower member 26 is collapsed adjacent the lower cabinet rail 17 as indicated at 73 in FIG. 9 and receives a V-shaped plastic clip 74 with a snap fit (see also FIGS. 3 and 4). An abutment 75 is struck down from the plate 31 of the upper member 25 in front of the depression 36 and, when the drawer is pulled out to the position shown in FIG. 13, the abutment strikes the clip (see FIG. 4) and stops the travel of the drawer. By lifting the front of the drawer, however, the abutment passes over the clip and the drawer may be removed completely from the cabinet. The clip 74 also may be utilized to prevent the drawer from rattling when closed and to retard closing of the drawer and, for these purposes, a resilient finger 76 (FIGS. 3 and 9) is struck down from the plate 31 of the upper member 25 and, as illustrated in FIG. 3, is positioned to bear against the top of the clip when the drawer is in the closed position.

In accordance with the present invention, each of the rollers 27, 27', 28 and 28' is constructed and arranged to cooperate with its associated track portion in a novel manner so that each roller has a relatively short axial profile but, at the same time, the roller has an effective diameter substantially greater than its actual diameter thereby increasing the load-bearing capacity of the roller. To these ends, the surface of each roller which engages the associated track portion is the frustum of a cone, or frusto-conical, and is inclined at an acute angle relative to the axis of the roller and the track portion is inclined relative to the roller axis at substantially the same acute angle whereby the force between the track and roller surface resulting from the load of the drawer 11 acts along a line generally perpendicular to the roller surface. Preferably, the angle of the roller surface is slightly smaller than the angle of the track portion so that the latter engages the roller surface at a succession of points forming a circle around the surface and the line of force between the track portion and the surface extends through these points. In actual practice, the track portion engages the roller surface at a small area rather than at a point and this area extended around the roller is a narrow bank but, for simplification, the terms "points" and "circle" are used in this description and in the claims.

Figure 7:
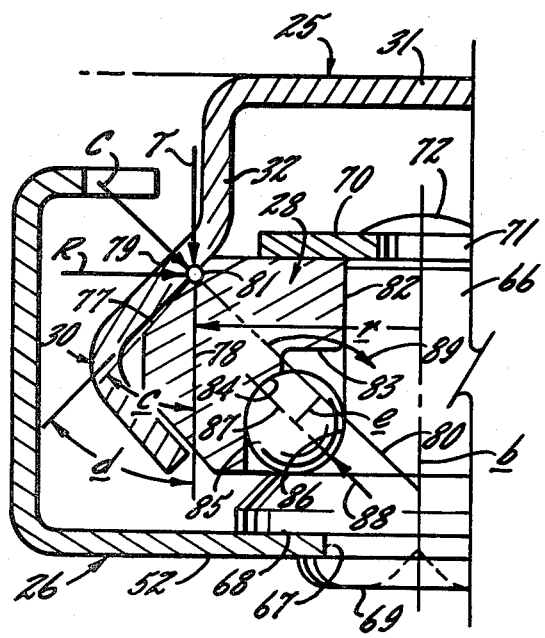
FIG. 7 is an enlarged fragmentary sectional view corresponding to the left-hand portion of FIG. 5.

With specific reference to the roller 28 (see FIGS. 5 and 7), the upper surface 77 of the roller is the frustum of a vertical cone whereby this surface is inclined at an acute angle c relative to the roller axis b, or to the line 78 which is parallel to the axis, and this angle is one-half the cone angle of the surface 77. The section 79 of the track portion 30 is inclined relative to the axis b at an acute angle d which preferably is slightly larger than the angle c. Typical magnitudes for these angles are 42 degrees for the angle c and 45 degrees for the angle d. Because the roller surface 77 and the track section 79 are at these acute angles, the vertical load of the drawer 11 on the roller as indicated by the vector arrow T in FIG. 7 is divided into a radial thrust R and a combined force C which is of the magnitude and in the direction of the actual force between the track section and the roller. Because of this, the effective radius of the roller 28 is the length of the line 80 which is substantially longer than the actual radius r and, thus, the roller is comparatively short in the vertical dimension but acts as if it were an appreciably larger roller. Moreover, with the force applied to the roller along the vector C, this force is transmitted to the stud 66 near the base of the latter and, as a result, the bending moment applied to the stud is quite small.

Because the angle c of the surface 77 of the roller 28 is smaller than the angle d of the track section 79, the track section engages the surface at a small elliptical area, indicated by the point 81 in FIG. 7, near the upper edge of the surface. As the roller 28 rolls in the track section 79, therefore, the track section engages a series of such points around the periphery of the surface and these points define a circle around the surface or actually, as stated above, a narrow band and the force represented by the vector C is applied at these points. This reduces any tendency of the roller to bind in the track section.

The rollers 28 and 28' carry a greater load than do the rollers 27 and 27' and, accordingly, the invention in a more detailed aspect contemplates supporting the former rollers in a novel manner on the studs 66 and 66' through the medium of bearing balls. For this purpose, the roller 28 (see FIG. 7) is formed with a bore 82 which receives the upper end portion of the stud 66 and with a counterbore 83 at the lower end of the bore. The counterbore is stepped to provide a downwardly and inwardly facing shoulder 84 and an enlarged space for receiving a plurality of bearing balls 85, herein eight. The surface of the shoulder is arcuate in cross section as is an opposing surface 86 formed between the flange 68 and the body of the stud 66. The balls 85 roll between these surfaces and the line 87 between the centers of the surfaces passes through the centers of the balls. As indicated by the arrow 88, the force between the stud and the balls acts along the line 87 which is parallel to the line 80 along which the force between the track section 79 and the roller 28 is applied (vector C) and the line 80 is offset from the centers of the balls by a distance e in a direction away from the plate 52. Thus, these two forces produce a force couple as indicated by the arcuate arrow 89 and this couple results in all of the balls supporting a portion of the load of the drawer although the balls support a progressively lesser portion of the load the further they are from the track section. The mounting of the roller 28' is the same as of the roller 28. Although they do not serve any significant functional purpose, the undersides 90 and 90' of the rollers 28 and 28' may be mirror images of the upper sides and the lower portions 91 and 91' of the skirts 32 and 32' are bent in under but out of engagement with the rollers (FIG. 5) except that these portions of the skirts are vertical along the rear end portion of the upper member 25 to provide clearance for the mounting of the other rollers 27 and 27' as shown in FIGS. 6 and 9.

The rollers 27 and 27' and their associated track portions 29 and 29' similarly are constructed and arranged to have a short vertical profile and to have effective diameters greater than their actual diameters. Because these rollers carry a substantially lesser load than do the rollers 27 and 27', no bearing balls are used with these rollers in the preferred embodiment and, instead, the plastic material from which they are molded is impregnated with a lubricating material as stated above. Also, because there is no need to correlate the line of force of the load of the drawer relative to centers of bearing balls, the rollers 27 and 27' may be somewhat larger than the rollers 28 and 28'.

Also, as the drawer 11 is opened, the load of the drawer on the rollers 27 and 27' shifts from a downward force to an upward force. Thus, as illustrated in FIGS. 11, 12 and 13 wherein it is assumed that the load in the drawer is evenly distributed so that the center of gravity is along the centerline 92, the force on the rollers 27 and 27' is downward when the drawer is fully closed. At this time, the force on the rollers 28 and 28' is at the minimum. For example, if the slide assembly 10 is designed to support a load of 60 pounds, each of the rollers 27 and 27' support 13.5 pounds and each of the rollers 28 and 28' support 16.5 pounds when the drawer is closed. As the drawer is opened, the force on the rollers 27 and 27' gradually decreases as indicated by the line 93 while the force on the rollers 28 and 28' gradually increases as indicated by the line 94. When the centerline 92 is at the axes of the rollers 28 and 28', the latter support the entire load and there is no force on the rollers 27 and 27'. Thereafter, the force on the rollers 28 and 28' increases further as indicated by the extension 95 of the line 94 (FIG. 13) while the force on the rollers 27 and 27' is directed upwardly as indicated by the extension 96 of the line 93. Accordingly, the invention in its more detailed aspects contemplates constructing the rollers 27 and 27' and the track portions 29 and 29' so that these rollers perform in essentially the same manner whether the force on them is upward or downard.

Figure 8:
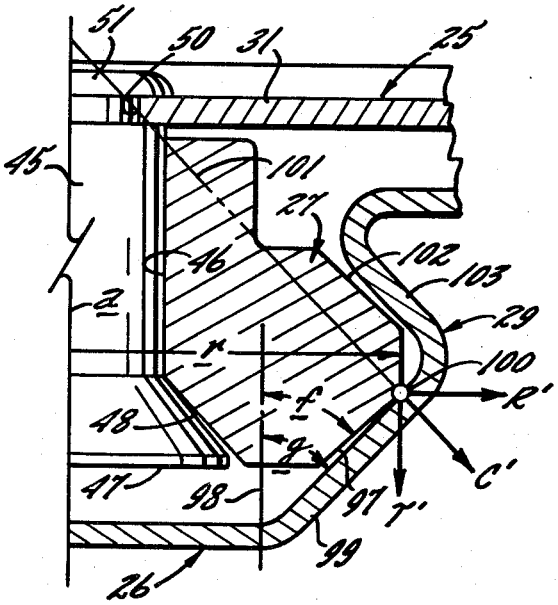
FIG. 8 is an enlarged fragmentary sectional view corresponding to the left central portion of FIG. 6.

To achieve the foregoing, each of the rollers 27 and 27' are formed with two surfaces which are mirror images and which are inclined at an acute angle relative to the axis a of the rollers and each of the track portions 29 and 29' forms two track sections similarly inclined with one section opposing each surface of the associated roller. Thus, when there is a downward force on these rollers, one of the surfaces engages the opposing track section and, when the force is upward, the other surface engages its opposing track section. With specific reference to the roller 27 and the track portion 29, the parts are shown in FIG. 8 in the condition in which the load of the drawer exerts a downward force T' on this roller. The underside of the roller is formed with a surface 97 which is the frustum of an inverted cone so that the surface is at an acute angle f relative to the axis a or to the parallel line 98, the angle f being one half the cone angle of the surface. The lower part 99 of the track portion 29 is also inclined at an acute angle g relative to the axis a and opposes the surface 97 so as to form a track section on which the surface rolls with the force vector T' being downward. Again, the angle f is preferably slightly smaller than the angle g so that the track section 99 engages the surface 97 at a series of points 100 which form a circle around the surface. As in the case of the roller 28 and the track section 79, 42 degrees is representative for the angle f and 45 degrees is representative for the angle g. The force T' is divided into a radial component R' and a combined force C' which is perpendicular to the track section 99 at the point 100 and is in the direction of the force between the surface and the track section. Thus, the effective radius of the roller 27 as indicated by the line 101 is much larger than the actual radius r' and, also, this line along which the force C' acts passes through the axis a near the base of the stud 45 so that there is very little bending moment applied to the stud.

When the load of the drawer 11 exerts an upward force on the roller 27 as indicated by the vector T" in FIG. 8a, an upper surface 102 on the roller engages a second track section 103 formed on the track portion 29. Actually, the roller slides up and down slightly on the stud 45 as will be seen from a comparison of FIGS. 8 and 8a although this sliding is exaggerated in the drawings. As a result, the surface 102 does not engage the track section 103 when the surface 97 is rolling on the track section 99 and vice versa. The upper surface 102 is a frustum of an upright cone so that the surface in inclined relative to the axis a (or the line 98) at an acute angle h. The track section 103 is inclined relative to the axis at an acute angle i to oppose the surface 102. The magnitudes of the angles h and i preferably are the same as those of the angles f and g respectively so that the track section 103 engages the surface 102 at a succession of points 104 forming a circle around the surface. Again, the force T" is composed of a radial component R" and combined component C" which represents the actual force between the track section 103 and the surface 102 with the force C" being applied at the point 104 and perpendicular to the track section. The line 105 which represents the effective diameter of the roller is the same length as the line 101 in FIG. 8. In this case, however, the force C" does apply a bending moment to the stud 45 but, because the load on the roller 27 is comparatively small, this is not of material consequence. As shown in FIG. 6, the roller 27' and the track portion 29' are similar to the roller 27 and the track portion 29 and corresponding parts are indicated by the same but primed reference characters.

It will be observed that all of the rollers of the slide assembly 10 have a comparatively short axial profile but a comparatively large effective diameter. At the same time, the assembly is relatively simple and inexpensive to manufacture and assembly.

I claim:

1. In a slide assembly for a drawer sliding in a frame, the combination of, first and second elongated parallel members spaced apart and opposing each other and adapted to extend lengthwise of a panel of the drawer, one of said members adapted to be attached to said panel and the other of said members adapted to be attached to said frame, and a roller journaled on said first member to turn about an axis perpendicular to said panel and disposed between said members, said second member having a track portion extending substantially throughout the length of said second member and projecting toward said first member for engagement with said roller, said track portion being inclined relative to the axis of said roller at a first acute angle, the peripheral surface of said roller opposing said track portion being generally frusto-conical and at a second acute angle relative to the axis of the roller, said second acute angle being slightly smaller than said first acute angle whereby said surface of said roller rolls on said track portion and the force between the surface and the track portion is generally perpendicular to the surface and whereby said track portion engages said surface of said roller at substantially a succession of points forming a circle around the surface and said force acts substantially along a line through said points.

2. In a slide assembly as defined in claim 1, a central bore formed in said roller, a shaft rigid with said first member and projecting into said bore coaxially with said roller whereby the roller turns about the shaft, a counterbore formed in said roller adjacent said first member, and a plurality of bearing balls disposed in said counterbore to transmit said force from said roller to said shaft while rolling to permit the roller to turn, said line of force being off-center of said balls in a direction away from said first member.

3. In a slide assembly for a drawer sliding in a frame, the combination of, a first elongated member extending lengthwise of the drawer and adapted to be attached to the bottom panel of the drawer, a second elongated member parallel to and spaced below said first member and adapted to be attached to the frame, a first roller journaled on said first member to about a vertical axis and disposed between said members and adjacent the rear of the drawer, a first track section formed on said second member and extending substantially throughout the length thereof, said first track section projecting upwardly from said second member for engagement with said first roller, the lower portion of said first roller being a frustum of an inverted cone, said first track section being inclined relative to the axis of said first roller at a first acute angle substantially equal to one-half the angle of said cone to engage the surface on said lower portion whereby the force between said surface and said first track section is generally perpendicular to the surface, a second roller journaled on said second member to turn about a vertical axis and disposed between said members adjacent the forward end of the second member, and a second track section formed on said first member and extending substantially throughout the length thereof, said second track section projecting downwardly from said first member for engagement with said second roller, the upper portion of said second roller being a frustum of an upright cone, said second track section being inclined relative to the axis of said second roller at a second acute angle substantially equal to one-half the angle of said upright cone to engage the surface on said upper portion of said second roller whereby the force between the latter surface and said second track section is generally perpendicular to the surface.

4. In a slide assembly as defined in claim 3 in which one-half the cone angle of said inverted cone is slightly smaller than said first acute angle and one-half the cone angle of said upright cone is slightly smaller than said second acute angle whereby said track sections engage the surfaces of the corresponding rollers at substantially a succession of points forming a circle around each surface and said forces act substantially along lines through said points.

5. In a slide assembly as defined in claim 4, a central bore formed in said second roller, a vertical shaft rigid with said second member and projecting into said bore coaxially with said second roller whereby said second roller turns about the shaft, a counterbore formed in said second roller at the lower end of said bore, and a plurality of bearing balls disposed in said counterbore to transmit the force from said second track section through said second roller and to said shaft while rolling to permit said second roller to turn, the line of said force extending above the centers of said balls.

6. In a slide assembly as defined in either of claims 3, 4 or 5 in which one-half of said angle of said cones and said acute angles are approximately 45 degrees.

7. In a slide assembly as defined in claim 3, a third roller journaled on said first member to turn about a vertical axis and disposed alongside said first roller with the lower portion similarly formed as a frustum of an inverted cone, a third track formed on said second member and being parallel to and spaced from said first track section to engage said third roller, said third track section being similarly inclined at an acute angle relative to the axis of said third roller but in the direction opposite to the inclination of said first section, a fourth roller journaled on said second member to turn about a vertical axis and disposed alongside said second roller with the upper portion similarly formed as a frustum of an upright cone, and a fourth track section formed on said first member and being parallel to and spaced from said second track section to engage said fourth roller, said fourth track section being similarly inclined at an acute angle relative to the axis of said fourth roller but in a direction opposite to the inclination of said second section.

8. In a slide assembly for a drawer sliding in a frame, the combination of, first and second elongated parallel members spaced apart and opposing each other and adapted to extend lengthwise of a panel of the drawer, one of said members adapted to be attached to said panel and the other of said members adapted to be attached to said frame, a stationary shaft rigid with said first member and projecting toward said second member with its axis perpendicular to said panel, an annular flange on said flange adjacent said first member, a roller journaled on said shaft to turn about said axis, a counterbore formed in said roller adjacent said flange, a plurality of bearing balls disposed in said counterbore, opposed annular concave surfaces formed on said shaft and in said counterbore to engage said balls, the line between the centers of said surfaces being inclined in a direction outwardly of said axis and toward said second member and passing through the centers of said balls, a portion of said roller being formed as a frustum of a cone, and a track section formed on said second member and extending substantially throughout the length thereof, said track section being inclined relative to the axis of said roller at an acute angle which is substantially equal to one-half the cone angle of said roller whereby the track section engages the surface of the roller, the force between said track section and said roller being generally perpendicular to the surface of the roller and being transmitted to said shaft through said balls as the roller rolls on the track section.

9. In a slide assembly as defined in claim 8 in which one-half said cone angle is slightly smaller than said acute angle whereby said track section engages the surface of said roller at substantially a succession of points forming a circle around the surface and said force acts along a line through said points, said line of said force being generally parallel to said line between and offset from the latter line in a direction away from said flange.

* * * * *